United States Patent
Rawat et al.

(10) Patent No.: US 10,262,006 B2
(45) Date of Patent: Apr. 16, 2019

(54) CONTEXTUALLY TRIGGERED ENTRY POINT

(71) Applicant: Microsoft Technology Licensing, LLC, Redmond, WA (US)

(72) Inventors: Anshul Rawat, Kirkland, WA (US); Raju Jain, Kirkland, WA (US); Thirumanjunathan Vellaiappan, Bothell, WA (US); Michael John Novak, Redmond, WA (US); Mohammed Amirali Samji, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 15/267,008

(22) Filed: Sep. 15, 2016

(65) Prior Publication Data

US 2017/0316031 A1    Nov. 2, 2017

Related U.S. Application Data

(60) Provisional application No. 62/329,360, filed on Apr. 29, 2016.

(51) Int. Cl.
  *G06F 17/30* (2006.01)
  *G06F 3/0482* (2013.01)
  *H04L 29/08* (2006.01)

(52) U.S. Cl.
  CPC ...... *G06F 17/30203* (2013.01); *G06F 3/0482* (2013.01); *G06F 17/30165* (2013.01); *G06F 17/30194* (2013.01); *H04L 67/16* (2013.01)

(58) Field of Classification Search
  CPC ... G06F 17/30203; G06F 3/0482; H04L 67/16
  See application file for complete search history.

(56) References Cited

U.S. PATENT DOCUMENTS

| 5,818,446 A | 10/1998 | Bertram |
| 5,859,636 A | 1/1999 | Pandit |
| 5,937,392 A | 8/1999 | Alberts |
| 6,072,486 A | 1/2000 | Sheldon et al. |
| 6,560,633 B1 | 5/2003 | Roberts |
| 6,678,696 B1 | 1/2004 | Helland |
| 6,785,670 B1 | 8/2004 | Chiang et al. |

(Continued)

FOREIGN PATENT DOCUMENTS

| JP | 200747988 | 9/2008 |
| KR | 20070115629 | 12/2007 |

(Continued)

OTHER PUBLICATIONS

Sutherland, Gavin, "Mobile search news and app visibility tips: it's all about UX", Published on: Sep. 16, 2015 Available at: http://www.blonde.net/blog/2015/09/16/mobile-search-news-and-app-visibility-tips-its-all-about-ux.

(Continued)

*Primary Examiner* — Roland J Casillas
(74) *Attorney, Agent, or Firm* — Workman Nydegger

(57) ABSTRACT

Providing contextual messages from a service to a user in a native application on a system. Embodiments determine a user specific context within the general context of the native application on a first device and provide in a user interface to the user information about the user specific context.

20 Claims, 6 Drawing Sheets

(56) References Cited

U.S. PATENT DOCUMENTS

| | | |
|---|---|---|
| 6,839,650 B2 | 1/2005 | Sutton et al. |
| 6,912,582 B2 | 6/2005 | Guo et al. |
| 6,970,869 B1 | 11/2005 | Slaughter |
| 7,032,211 B1 | 4/2006 | Janzig et al. |
| 7,114,148 B2 | 9/2006 | Irving |
| 7,243,298 B2 | 7/2007 | Yozell-Epstein et al. |
| 7,243,309 B2 | 7/2007 | Koay |
| 7,346,325 B2 | 3/2008 | Zaidi |
| 7,395,317 B2 | 7/2008 | Naick et al. |
| 7,428,570 B2 | 9/2008 | Nobili |
| 7,487,446 B2 | 2/2009 | Hargarten et al. |
| 7,581,194 B2 | 8/2009 | Iwema et al. |
| 7,607,136 B2 | 10/2009 | Kuno et al. |
| 7,640,348 B2 | 12/2009 | Atwal et al. |
| 7,657,609 B2 | 2/2010 | Klevenz et al. |
| 7,716,234 B2 | 5/2010 | Naibo et al. |
| 7,721,228 B2 | 5/2010 | Burke et al. |
| 7,949,230 B2 | 5/2011 | Tsukamoto |
| 8,032,482 B2 | 10/2011 | Rosenberg et al. |
| 8,117,542 B2 | 2/2012 | Radtke et al. |
| 8,146,110 B2 | 3/2012 | Lydersay |
| 8,381,133 B2 | 2/2013 | Iwema et al. |
| 8,464,168 B2 | 6/2013 | Bump et al. |
| 8,660,891 B2 | 2/2014 | Ramer et al. |
| 8,938,726 B2 | 1/2015 | Barak |
| 9,075,508 B1 | 7/2015 | Cronin |
| 2001/0034646 A1 | 10/2001 | Hoyt et al. |
| 2002/0073058 A1 | 6/2002 | Kremer et al. |
| 2002/0080154 A1 | 6/2002 | Matthews et al. |
| 2002/0085224 A1 | 7/2002 | Price et al. |
| 2002/0186257 A1 | 12/2002 | Cadiz et al. |
| 2003/0043200 A1 | 3/2003 | Faieta et al. |
| 2003/0090510 A1 | 5/2003 | Shuping et al. |
| 2003/0097233 A1 | 5/2003 | Sutton et al. |
| 2003/0146939 A1 | 8/2003 | Petropoulos et al. |
| 2003/0164862 A1 | 9/2003 | Cadiz et al. |
| 2003/0177248 A1 | 9/2003 | Brown et al. |
| 2004/0054690 A1 | 3/2004 | Hillerbrand et al. |
| 2004/0068527 A1 | 4/2004 | Smith |
| 2004/0157202 A1 | 8/2004 | Hopkins et al. |
| 2004/0205672 A1 | 10/2004 | Bates et al. |
| 2004/0243942 A1 | 12/2004 | Cortright |
| 2004/0263475 A1 | 12/2004 | Wecker et al. |
| 2005/0005248 A1 | 1/2005 | Rockey et al. |
| 2005/0015462 A1 | 1/2005 | Lee et al. |
| 2005/0039141 A1 | 2/2005 | Burke et al. |
| 2005/0086304 A1 | 4/2005 | Naick et al. |
| 2005/0102629 A1 | 5/2005 | Chen et al. |
| 2005/0105025 A1 | 5/2005 | Omaboe |
| 2005/0125741 A1 | 6/2005 | Clow et al. |
| 2005/0132296 A1 | 6/2005 | Milic-Frayling et al. |
| 2005/0160434 A1 | 7/2005 | Tan |
| 2005/0240902 A1 | 10/2005 | Bunker et al. |
| 2006/0036568 A1 | 2/2006 | Moore et al. |
| 2006/0036945 A1 | 2/2006 | Radtke et al. |
| 2006/0041891 A1 | 2/2006 | Aaron |
| 2006/0069990 A1 | 3/2006 | Yozell-Epstein et al. |
| 2006/0074869 A1 | 4/2006 | Rosenberg et al. |
| 2006/0085741 A1 | 4/2006 | Weiner et al. |
| 2006/0095343 A1 | 5/2006 | Clarke et al. |
| 2006/0101046 A1 | 5/2006 | Hargarten et al. |
| 2006/0112141 A1 | 5/2006 | Morris |
| 2006/0143568 A1 | 6/2006 | Milener et al. |
| 2006/0218086 A1 | 7/2006 | Campbell et al. |
| 2006/0179440 A1 | 8/2006 | Besbris |
| 2006/0184890 A1 | 8/2006 | Altenhofen |
| 2006/0200780 A1 | 9/2006 | Iwema et al. |
| 2006/0206559 A1 | 9/2006 | Xie |
| 2006/0206567 A1 | 9/2006 | Milligan et al. |
| 2006/0212593 A1 | 9/2006 | Patrick et al. |
| 2006/0230068 A1 | 10/2006 | Coulombe |
| 2006/0271858 A1 | 11/2006 | Yolleck et al. |
| 2007/0016573 A1 | 1/2007 | Nanavati |
| 2007/0044086 A1 | 2/2007 | Sampath |
| 2007/0079250 A1 | 4/2007 | Bump et al. |
| 2007/0100650 A1 | 5/2007 | Ramer et al. |
| 2007/0106952 A1 | 5/2007 | Matas et al. |
| 2007/0106956 A1 | 5/2007 | Platt et al. |
| 2007/0150546 A1 | 6/2007 | Karakashian |
| 2007/0168926 A1 | 7/2007 | Rajah |
| 2007/0174420 A1 | 7/2007 | Khusial et al. |
| 2007/0226614 A1 | 9/2007 | Lorenzen et al. |
| 2007/0255689 A1 | 11/2007 | Sun et al. |
| 2007/0280206 A1 | 12/2007 | Messer et al. |
| 2007/0282879 A1 | 12/2007 | Degenkolb et al. |
| 2008/0022229 A1 | 1/2008 | Khumkar |
| 2008/0092171 A1 | 4/2008 | Roberts et al. |
| 2008/0098085 A1 | 4/2008 | Rolf et al. |
| 2008/0134093 A1 | 6/2008 | Dharmarajan et al. |
| 2008/0195628 A1 | 8/2008 | Kim |
| 2008/0214153 A1 | 9/2008 | Ramer et al. |
| 2008/0228924 A1 | 9/2008 | Herberger et al. |
| 2008/0307385 A1 | 12/2008 | Dreiling et al. |
| 2009/0024953 A1 | 1/2009 | Selig |
| 2009/0083618 A1 | 3/2009 | Campbell |
| 2009/0100342 A1 | 4/2009 | Jakobson |
| 2009/0063415 A1 | 5/2009 | Chatfield et al. |
| 2009/0083289 A1 | 5/2009 | Morris |
| 2009/0150910 A1 | 6/2009 | Lyndersay |
| 2009/0228014 A1 | 9/2009 | Kim et al. |
| 2009/0256558 A1 | 10/2009 | Fujita et al. |
| 2009/0259969 A1 | 10/2009 | Pallakoff |
| 2009/0282361 A1 | 11/2009 | Cortright |
| 2009/0286558 A1 | 11/2009 | Zufi et al. |
| 2009/0298490 A9 | 12/2009 | Janik |
| 2009/0309489 A1 | 12/2009 | Iwema et al. |
| 2009/0319680 A1 | 12/2009 | Owen et al. |
| 2010/0069035 A1 | 3/2010 | Johnson |
| 2010/0174713 A1 | 7/2010 | Baessler et al. |
| 2010/0179876 A1 | 7/2010 | Holte |
| 2010/0192098 A1 | 7/2010 | Kim |
| 2010/0332325 A1 | 12/2010 | Holte |
| 2011/0078232 A1 | 3/2011 | Van Den Driessche |
| 2011/0193780 A1 | 8/2011 | Schaaf |
| 2012/0158472 A1 | 6/2012 | Singh et al. |
| 2012/0190386 A1 | 7/2012 | Anderson |
| 2012/0204129 A1 | 8/2012 | Lindsersay |
| 2013/0254699 A1* | 9/2013 | Bashir ............... G06F 3/0481 715/772 |
| 2014/0201681 A1 | 7/2014 | Mahaffey et al. |
| 2014/0223372 A1 | 8/2014 | Dostie et al. |
| 2014/0229839 A1* | 8/2014 | Lynch ............... G06F 9/44505 715/736 |

FOREIGN PATENT DOCUMENTS

| | | |
|---|---|---|
| WO | 2007142430 | 12/2007 |
| WO | 2014117244 A1 | 8/2014 |

OTHER PUBLICATIONS

"Promoting Apps with Smart App Banners", Published on: Nov. 5, 2013 Available at: https://developer.apple.com/library/mac/documentation/AppleApplications/Reference/SafariWebContent/PromotingAppswithAppBanners/PromotingAppswithAppBanners.html.

"Add an App Install Banner on Your Mobile Website", Retrieved on: Apr. 28, 2016 Available at: http://developer.android.com/distribute/users/banners.html.

Mir, Fawad, "Get an Enhanced Windows 'Open With' Menu With Better App Suggestions", Published on: Feb. 15, 2013 Available at: http://www.addictivetips.com/windows-tips/enhanced-windows-open-with-menu-with-better-app-suggestions/.

"Notice on Reexamination" issued in Chinese Application No. 200980107880.X dated May 19, 2015, 14 pages.

"Decision to Grant" issued in EP Application No. 09716904.9, dated Nov. 13, 2014, 1 page.

"Foreign Office Action" cited in Japanese Application No. 2010549700 dated Jul. 25, 2014, 34 pages.

"Office Action" issued in Japanese Application No. 2010549700 dated Oct. 30, 2013, 6 pages.

(56) References Cited

OTHER PUBLICATIONS

"Foreign Office Action" cited in Chinese Application No. 200980107880.X dated Jan. 16, 2014, 14 pages.
"Summons to Attend Oral Proceedings" cited in EP Application No. 09716904.9, dated Jan. 31, 2014, 9 pages.
"Accelerators in Internet Explorer 8 Beta 2", Retrieved from <http://www.code-magazine.com/Article.apsx?quickid=0811062> on Dec. 1, 2008, pp. 1-5.
Garret: "Ajax: A New Approach to Web Applications", Retrieved from <http://www.adaptivepath.com/ideas/essays/archives/000385.php> on Nov. 28, 2008, Feb. 18, 2005, 6 pages.
"Filename Extension", Retrieved from <http://web.archive.org/web/20071202041958/http://en.wikipedia.org/wiki/Filename_extension> on Jan. 27, 2013, Dec. 1, 2007, 7 pages.
"What's New for IE8 Search", Retrieved from Http://blogs.msdn.com/ie/Default.aspx?p=2 on Dec. 1, 2008., 34 pages.
"Foreign Office Action" cited in Chinese Application No. 200980107880.X dated Jun. 18, 2013, 14 pages.
"Foreign Office Action" cited in European Patent Application No. 09716904.9 dated Jun. 21, 2013, 6 pages.
"Foreign Office Action" cited in Japanese Application No. 2010549700 dated Feb. 20, 2013, 6 pages.
"Foreign Office Action" cited in Chinese Application No. 200980107880.X dated Jul. 3, 2012, 12 pages.
"Extended European Search Report" cited in EP Application No. 09716904.9, dated Sep. 17, 2012, 6 pages.
"Foreign Office Action" cited in Japanese Application No. 2010549700, dated Nov. 12, 2012, 8 pages.
"Foreign Office Action" cited in Chinese Application No. 200980107880.X, dated Jan. 30, 2013, 15 pages.
Chavez, Joe: "Multi-tier Internet Architecture with Java, UML, and OOA&D", *Astronomical Data Analysis Software and Systems IX, ASP Conference Series,* vol. 216, 2000, pp. 75-78.
Sheng, et al: "Self-Serv: A Platform for Rapid Composition of Web Services in Peer-to-Peer Environment", *Proceedings of the 28th VLDB Conference,* Available at <http://eprints.qut.edu.au/archive/00000586/01/dumas_self-serv.pdf>, 2002, 4 pages.
Ferguson, et al: "Service-Oriented Architecture: Programming Modal and Product Architecture", Retrieved from <http://www.research.ibm.com/journal/s/j/444/ferguson.html> on Oct. 9, 2007, (Oct. 21, 2005), 23 pages.
"Foreign Office Action" cited in Chinese Application 200980107880.X, dated Aug. 12, 2011, 9 pages.
Microsoft Office Word 2003 attached screen shots. Word copyright 1983-2003.
Huffman, "New Climate Area Released", Feb. 27, 2008, Available at <http://blogs.hamweather.com>.
"Defining Cross-Browser Tooltips", May 27, 2007, Mozilla Developer Network.
"Tooltip.js: Creating simple tooltips", Nov. 29, 2005, Available at : <http://ajazian.com/archives/tooltipsjs-creating-simple-tooltips.
"International Search Report and the Written Opinion" cited in PCT Application No. PCT/US2009/034122, dated Sep. 28, 2009.
"Enhance your Web Browsing Experience!", CrazyBrowser.com, 2000-2006, p. 1-2.
Galli, et al: "Inner-Browsing: Extending Web Browsing the Navigation Paradigm", May 16, 2003, p. 1-6.
"SlimBrowser", FlashPeak.com, Sep. 14, 2007, p. 1-2.
U.S. Appl. No. 12/042,333, dated Jun. 13, 2016, Office Action.
U.S. Appl. No. 12/042,333, dated Oct. 5, 2015, Office Action.
U.S. Appl. No. 12/042,333, dated May 4, 2015, Office Action.
U.S. Appl. No. 12/042,333, dated Nov. 17, 2014, Office Action.
U.S. Appl. No. 12/042,333, dated Oct. 16, 2012, Office Action.
U.S. Appl. No. 12/042,333, dated May 9, 2012, Office Action.
U.S. Appl. No. 12/042,333, dated May 26, 2011, Office Action.
U.S. Appl. No. 12/042,333, dated Dec. 9, 2010, Office Action.
International Search Report and the Written Opinion, issued in PCT Application No. PCT/US2017/029234 dated Jul. 12, 2017.

\* cited by examiner

CONTEXTUALLY TRIGGERED ENTRY POINT

CROSS-REFERENCE TO RELATED APPLICATIONS

This application claims the benefit of and priority to U.S. Provisional Patent Application Ser. No. 62/329,360 filed on Apr. 29, 2016 and entitled "Contextually Triggered Entry Point," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

When a user uses operating system based applications, that is operating system component applications that are integrated as part of the operating system itself, on a computing system, there are limitations to what the operating system components can surface to a user. For example, consider a file system manager that is part of a computing system operating system. Typically such file system managers are useful for locating and opening files. Some operating system components also include functionality for working with external services. For example, in the file system manager example, services such as OneDrive® available from Microsoft®, Corporation of Redmond, Wash. or Dropbox® available from Dropbox®, Inc. of San Francisco, Calif., can be integrated with a file system manager that is integrated into an operating system on a computing system. In these cases, the operating applications can only be used to navigate service content (such as files stored in cloud storage). For example, the user may be able to locate and open files, but not much else.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computer implemented method of providing contextual messages from a service to a user in a native application on a system. The method includes determining a user specific context within the general context of the native application on a first device and providing in a user interface to the user information about the user specific context. Such information may be, for example, additional application or service information or collaboration information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein allow operating system based applications to provide information to a user based on specific context information in the context of the operating system based application. Thus for example, consider the case where the operating system based application is a file manager application. The file manager application may connect to one or more external services allowing the user to navigate the services to find stored files. For example, the file manager application may be coupled to a cloud file storage service such as OneDrive® cloud file storage system available from Microsoft® Corporation of Redmond, Wash. The user could use the file manager application that is included in an operating system as part of the operating system to navigate files in cloud storage at the service.

Embodiments described herein may allow the service to provide additional contextual information to the user when the user is navigating files stored on the cloud file storage service. For example, the cloud file storage service may determine that the user is attempting to open an image file. The cloud file storage service can send a message to the operating system identifying a number of programs that might be useful for opening and editing the image file navigated to by the user. The file manager application could surface this information to the user. This information regarding applications that can be used to open and operate on the image file is not stored within the image file itself, but rather is known by the cloud a file storage service and provided to the operating system based application, i.e., the file manager, which can then surface the information to the user in various fashions, such as those described in more detail below.

Figure 1:
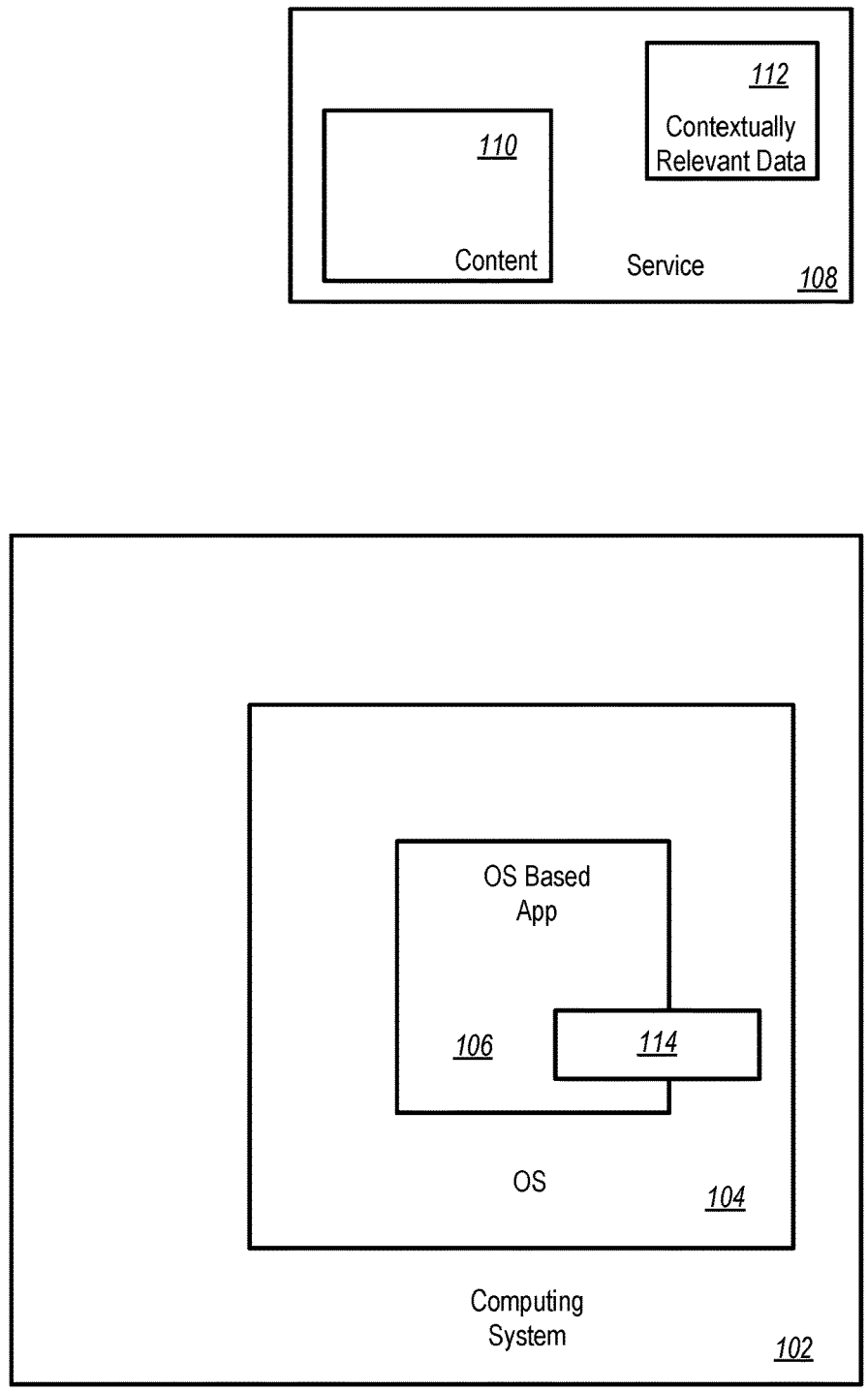
FIG. 1 illustrates a computing system coupled to a service where the computing system is configured to provide contextual information to a user.

Referring now to FIG. 1, an example is illustrated. FIG. 1 illustrates a computing system 102. The computing system may have an operating system 104 on the computing system 102. The operating system 104 includes a number of different operating system components. Some of the components included in the operating system may be operating system based applications. FIG. 1 illustrates an example of an operating system based application 106.

Operating system based applications are applications that are integral to the operating system 104. One example of such an application is a file manager application.

The operating system based application 106 may be able to access a service such as the service 108. The service 108 stores content 110. The content 110 may be user content for the user of the computing system 102. For example, a user may have an account on the service 108 where they can store content 110. The user can use the operating system based application 106 to access and browse content 110. For example, as illustrated above, if the operating system based application 106 is a file manager, then the operating system based application 106 can access content 110 which may include various cloud stored files.

The service 108 may additionally include contextually relevant data 112. The contextually relevant data 112 may include information that may be useful to a user of the computing system 102 at various specific context points within the operating system based application 106. Thus for example, if a user is using the operating system based application 106 to navigate the content 110, and the user is approaching a point where no more storage is available in the user's account on the service 108, the contextually relevant data 112 may include information identifying that the user should subscribe to more data storage on the service 108. This information can be provided from the contextually relevant data 112 at the service 108 to the operating system based application 106 which can then be surfaced to the user in a notification 114.

As will be illustrated in more detail below, the contextually relevant data 112 may include a number of different types of contextually relevant data. For example, in some embodiments the contextually relevant data may identify additional applications or services that may be of use to the user of the computing system 102 when using the service 108, or when accessing certain types of content included in the content 110. Alternatively or additionally, the contextually relevant data 112 may include collaboration data. Such collaboration data may identify that others have previously collaborated on portions of content in the content 110 and that the content is awaiting input from the user of the computing system 102. Alternatively or additionally, the collaboration information may include information identifying what other users have access to one or more pieces of content in the content 110. Other collaboration data may be provided additionally or alternatively.

Thus, embodiments may offer tailored custom computer user experiences based on a current condition or activity of a computer.

The following illustrates a number of functional examples:

1. A computing system 102 is running low on space, embodiments can inform the user of the computing system 102 of storage that can be obtained in a cloud based storage system by subscribing to the cloud based storage system.

2. A user is viewing photos and embodiments could identify for the user programs that easily edit and organize photos.

3. Based on something the user is doing in a file manager, embodiments can showcase an application to a user that the user does not currently have that would meet the user's needs.

Embodiments may include functionality of having custom notifications in operating system surfaces that are actionable, with a rich presentation style. Additionally or alternatively, embodiments may implement cloud based authoring and content delivery that does not require the delivered content to be baked into the operating system image. Additionally or alternatively, embodiments may include functionality to have the flexibility of when messages appear, how long messages appear for and user engagement based on the ability to control the messaging.

The surfaces of the user interface element in operating-system-level components, such as an operating system file manager. can be used to deliver custom information to a user. Surfaces can be applied to banners, custom properties, etc.

A banner is a custom UI surface shown in an operating system component, such as a file manager, to deliver contextual messages to the user about products or services, state information, or other contextual information related to the user's current content/applications. The banner may be implemented as a notification 114.

Banners are targeted to the user and are data driven. They may be based on user and device profile insights. Banners are contextual to the user's activity, as will be illustrated in more detail below.

The following illustrates experience details, including user interface (UI) and related information:

A banner, in some embodiments, may be rendered in a number of different locations. For example, in some embodiments, banners may be rendered in a quick access location. For example, banners may be rendered in a file manager, and specifically when the context is in the context of the computing system or some sub locations, such as documents, pictures, music, videos, etc.

Alternatively or additionally, banners may be provided in a provider namespace and sub locations. In particular, banners may be provided for third party services that can be navigated to using operating system components such as a file manager. For example, banners may be provided at the root of an online storage service. For example, banners may be provided at the root OneDrive® as well as OneDrive\Pictures, OneDrive\Documents, etc.

In some embodiments, banners are rendered above the content area, and are displayed so as to not obscure the content.

In some embodiments, banners are rendered on navigating to a location or on refresh of the location. In some embodiments, banners cannot be injected directly when the user is already on the page (in other words, a refresh or a reload may be required for those embodiments).

Banner and Content on page experience:

In some embodiments, if users keep the banner on and scroll, the banner will remain on screen as content is scrolled.

Embodiments may be implemented to allow users to select settings for allowing or disallowing banners. Some embodiments may be implemented where the operating system will offer a banner rendering preference setting to users.

For example, some embodiments may allow the setting to be set at True or False (or some other equivalent binary setting). Some embodiments may be implemented where this setting is set to True as the default. When the setting is set to False, in some embodiments: 1) a provider should respect the setting and not program any banners; the operating system should not process any banners for any locations, however, any banners already rendered will not dynamically be removed (however on refresh or reload the banners will not be rendered).

In some embodiments, when this setting is changed to True from False: 1) the provider will re-program banners and 2) any previous banners already programmed but which the operating system has not rendered are rendered, if eligible. Embodiments may also reset the display counter and reset the re-display interval (described in more detail below).

The following illustrates various details that may be implemented in some embodiments of the invention. In some embodiments, the operating system shell owns the rendering of the banner in the operating system components, such as a file manager. In some such embodiments, shell will render the banner on a user navigating to the location or on a refresh of the location.

Banners may be rendered in various location contexts within operating system components. For example, in a file manager example, banners may be rendered in namespace contexts, such as cloud service namespaces and/or system namespaces. In some embodiments banner rendering may be programmed and targeted per namespace location. To set a banner to render for a particular location, the shell is notified when a banner is set. The shell will connect with a system component to gather information about the validity of the banner if programmed for the system location.

Banners may be provided by business partners recommending various application and/or service offerings. The banner may be required to comply with certain design guidelines before it can be rendered. In some embodiments, a banner is incomplete and will not be rendered if base requirements of design are not met Embodiments may be implemented such that the content required to render the banner should be present locally on the system for shell to access and consume. For example, some required assets for the banner may include, headline and body text, button count, text for the buttons and the dismiss button availability.

Banners may be implemented within a particular scenario type. In particular, to allow for granular level banner rendering logic, banner rendering scenarios may belong to a set of scenario types. The operating system is aware of the scenario types as constraints may apply based on the scenario type rather than having a blanket constraint on the location.

The following illustrate a number of example scenario types:

Upsell—includes offerings for applications, additional services, additional storage, etc.

Engage—includes information about default save and future opt-in to default save scenarios.

Service—includes synchronization errors, no service, out of storage, etc.

While not enumerated here, other scenarios may be implemented.

The following now illustrates details with respect to banner render time that may be implemented in some embodiments. For system locations, a given banner once rendered, in some embodiments, will continue to be rendered on re-launch.

In alternative embodiments, the banner will continue to be rendered until a certain time period has elapsed. Once the time period has elapsed, the banner will not be displayed on next visit to a system location. Note that in some embodiments, user settings can be configured to set the time for this display period to be less than the operating system constraint and in that condition, the lower time period is respected. Note that in some embodiments, a system enforced banner render time will be applicable for banners displayed in a cloud service namespace.

In some embodiments, the banner render time is counted from the time the banner is displayed. In some embodiments, the banner render time will include time when an operating system component window, such as a file manager window is minimized.

In some embodiments, system locations will have stricter constraints on what is displayed in banners and when to display banners. For example, in some embodiments, for system namespace locations: the operating system will enforce a re-display interval on a per scenario type. This display interval will constrain the re-rendering of a banner in the system namespace. For example: the upsell scenario type may have a 7-day banner re-display interval. For example, if an upsell application banner was displayed in a quick access context of a file manager to user Joe on February 15th AND Joe did not take an action on the banner, the banner if programmed again would be eligible to be displayed on February 22nd in the quick access context.

Note that the banner render time is the duration a banner instance is allowed to be rendered in a given location on navigation or refresh, while the re-display interval is to cap when a banner is eligible to be rendered again after the banner was already displayed once.

Some embodiments may include a "show banner in child nodes on navigate" setting, or similar setting. This setting could have a value of True or False. In some embodiments this is only to be specified for cloud locations. This specifies to shell if the same banner needs to be shown to the user for each child node as the user is navigating.

On navigating to a location, shell will check if there are banners to be displayed and will render if conditions are met. Banner rendering is based on the constraints associated with the banner and if the banner provider is asking shell to check for some operating system conditions.

Some embodiments may include functionality for determining banner priority. For example, banner priority may be set to break a tie between two banners. In some embodiments, priority may be based on a per banner scenario level.

Embodiments may be implemented where banner style is enforced by a shell design template. Note that in some embodiments, banner template updates can only be done via operating system updates. Some embodiments may allow for a servicing update only when absolutely critical to have a new template.

Some embodiments may include functionality for banner insights reporting. For example, in some embodiments banner telemetry is reported on render and on action.

Embodiments may include functionality for banner takedown. For example, in some embodiments the banner will be removed on the user action of a button tap, or dismiss user selection. In some embodiments there will be banners which will be rendered again on a dismiss user selection when a user comes back to a given location (e.g., depending on the frequency cap and interval and the recursive behavior).

The following outlines various scenarios for using banners.

Figure 2A:
FIG. 2A illustrates a contextual notification.
Figure 2B:
FIG. 2B illustrates another example of a contextual notification.

In one scenario, a user has yet to sign-in to a sync client with their on-line service account. There may be a desire to have the user sign-in/signup to start using a storage or other service. Examples of this are illustrated in FIGS. 2A and 2B. This scenario is an upsell type scenario. This scenario may be applicable, for example, to the quick access root context or to the cloud namespace context.

In another scenario, a storage service user has opted in to default save where files and data are automatically saved to an online service. Embodiments can inform the user about a storage service value during their initial sync. Examples of this are illustrated in FIGS. 2C through 2F. This scenario is an upsell type scenario. This scenario may be applicable to the quick access root context. This scenario may be also applicable to the cloud namespace context.

Figure 2C:
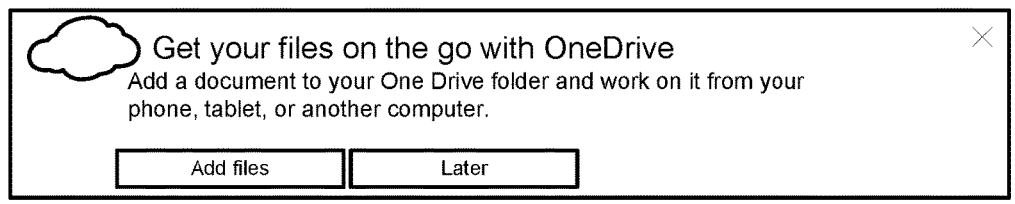
FIG. 2C illustrates another example of a contextual notification.
Figure 2D:
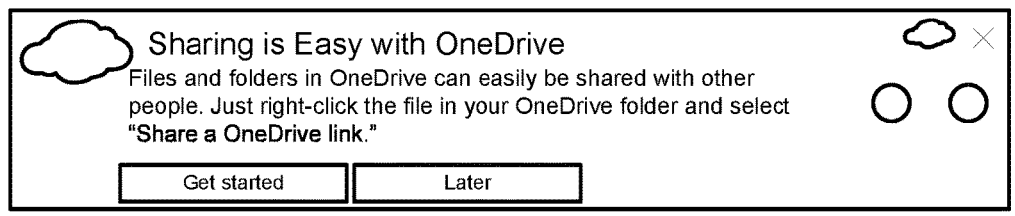
FIG. 2D illustrates another example of a contextual notification.
Figure 2E:
FIG. 2E illustrates another example of a contextual notification.
Figure 2F:
FIG. 2F illustrates another example of a contextual notification.

In another scenario, embodiments can detect that a user is a heavy document user. Embodiments can educate the user on how to move their documents to a storage service. Examples of this are illustrated in FIGS. 2E and 2F. This scenario is an engagement type scenario. The scenario may be applicable, for example, when a user navigates to a documents folder on the computing system.

In another scenario, a user signs up to a storage service for the first time. Embodiments may wish to encourage them to use the product and download other storage service apps. Examples of this are illustrated in FIGS. 2C through 2E. This scenario is an engagement type scenario. This scenario may be applicable to the cloud namespace context.

In another scenario, a user configures selective sync and files have finished downloading. This presents an opportunity to reinforce product value proposition and allow the user to explore product scenarios. Examples of this are illustrated in FIGS. 2C through 2E. This scenario is an engagement type scenario. This scenario may be applicable to the cloud namespace context.

Figure 2G:
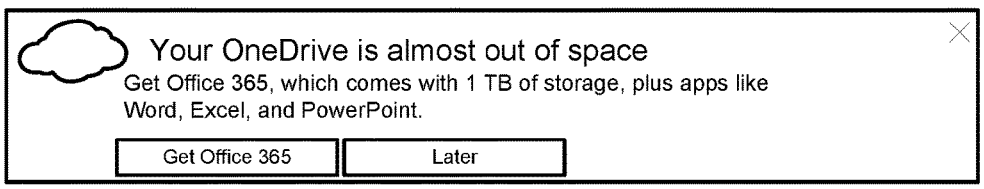
FIG. 2G illustrates another example of a contextual notification.
Figure 2H:
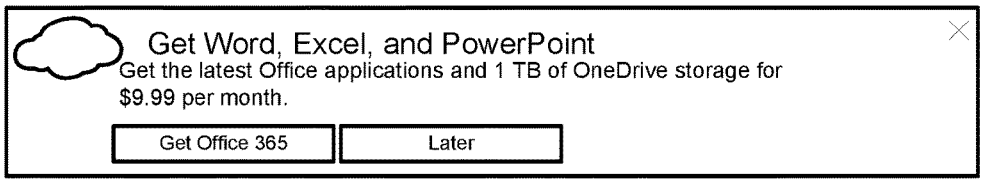
FIG. 2H illustrates another example of a contextual notification.

In another scenario, based on usage patterns embodiments can target specific users with application subscription or purchase promotions. An example of this is illustrated in FIG. 2H. This scenario is an upsell type scenario. This scenario may be applicable to the quick access root context. This scenario may be additionally or alternatively applicable to the cloud namespace context.

In another scenario, a user has 2% of their storage quota (or some other threshold amount) remaining at an online storage service. Embodiments can present a storage offer to them to encourage them to upgrade their plan. An example of this is illustrated in FIGS. 2G and 2H. This scenario is an upsell type scenario. This scenario may be applicable to the cloud namespace context.

In another scenario, a synchronization error has occurred, requiring user action. Embodiments can educate the user about the error and allow the synchronization client to handle the flow. This scenario is a service type scenario. This scenario may be applicable, for example, to the cloud namespace context.

In another scenario, selective synchronization is required as the local disk does not have enough space for all content to be synced locally. This scenario is a service type scenario. This scenario may be applicable to the quick access root context. This scenario may be additionally or alternatively applicable to the cloud namespace context.

In another scenario, a user may be in a non-storage service country wherein on-line storage services are not provided. Embodiments can provide a link to more information. This scenario is a service type scenario. This scenario may be applicable, for example, to the cloud namespace context.

As noted above, some embodiments may use banner templates. The following illustrates one example of a banner template.

In some embodiments, the user interface elements of a banner may include: headline text, body text, a main image, one or more additional images, buttons, dismiss control, etc.

Embodiments may require the banner to have at least a few elements to be present before being rendered to prevent rendering an empty/incomplete banner. In some embodiments, at a minimum, the headline text or the body text has to be present for any banner to render.

The following illustrates additional details that may be implemented in some embodiments.

Embodiments may include a rendering area that has fixed width and height. The controls will not overflow with the resizing of the window. On a high DPI window, and on max window of the file manager, the banner will fill the entire width of the content area with the dismiss control and the secondary image adjusts to the width of the banner.

In some embodiments, the banner is hidden on window resize. When in a medium icon view, the row switches from, for example, 4 columns to 3 columns In some embodiments, headline text does not reflow to the next line on resize of the window.

In some embodiments, body text will reflow as long as the text doesn't exceed the 2 lines.

In some embodiments, variable buttons are provided. The buttons actions are designed and controlled by the provider (e.g., the on-line service provider).

To ensure that the banners rendered in the operating system component (e.g., the file manager) are rendered by providers within their namespace and limit the rendering of banners in system namespace locations to specific providers, embodiments may enforce certain requirements including:

1. When programming a banner using the interface provided by the operating system, providers will have to provide the provider ID given to them when registering for a Sync Root.

2. The system will reject/not render banners by Providers when there is an attempt of them trying to program a banner outside their namespace.

3. The system will validate with the content delivery solution for the validity of banners programmed for the system namespace. If validation fails, the banner won't be rendered.

4. Any impersonation attempt to program ones own banner in another provider's namespace (and pretending to be the other provider) is taken down via a code update Embodiments may be implemented where banners support High Contrast experiences.

Embodiments may be implemented where text narrator functionality is supported. In such embodiments, the narrator will read out the content as the user navigates through the different controls. Button options may also be read out. For each banner, embodiments may announce that a banner is available (when present and set focus to banner when the operating system component launches to a particular namespace with a banner. Embodiments may also allow tabbing through the elements. In one embodiment, the tab order may be as follows:

1. Announce: Title
2. Announce: Body/content
3. Announce Buttons (Text)
4. Announce Dismiss option (when programmed)
5. Tab next to exit out of the banner to the next element The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
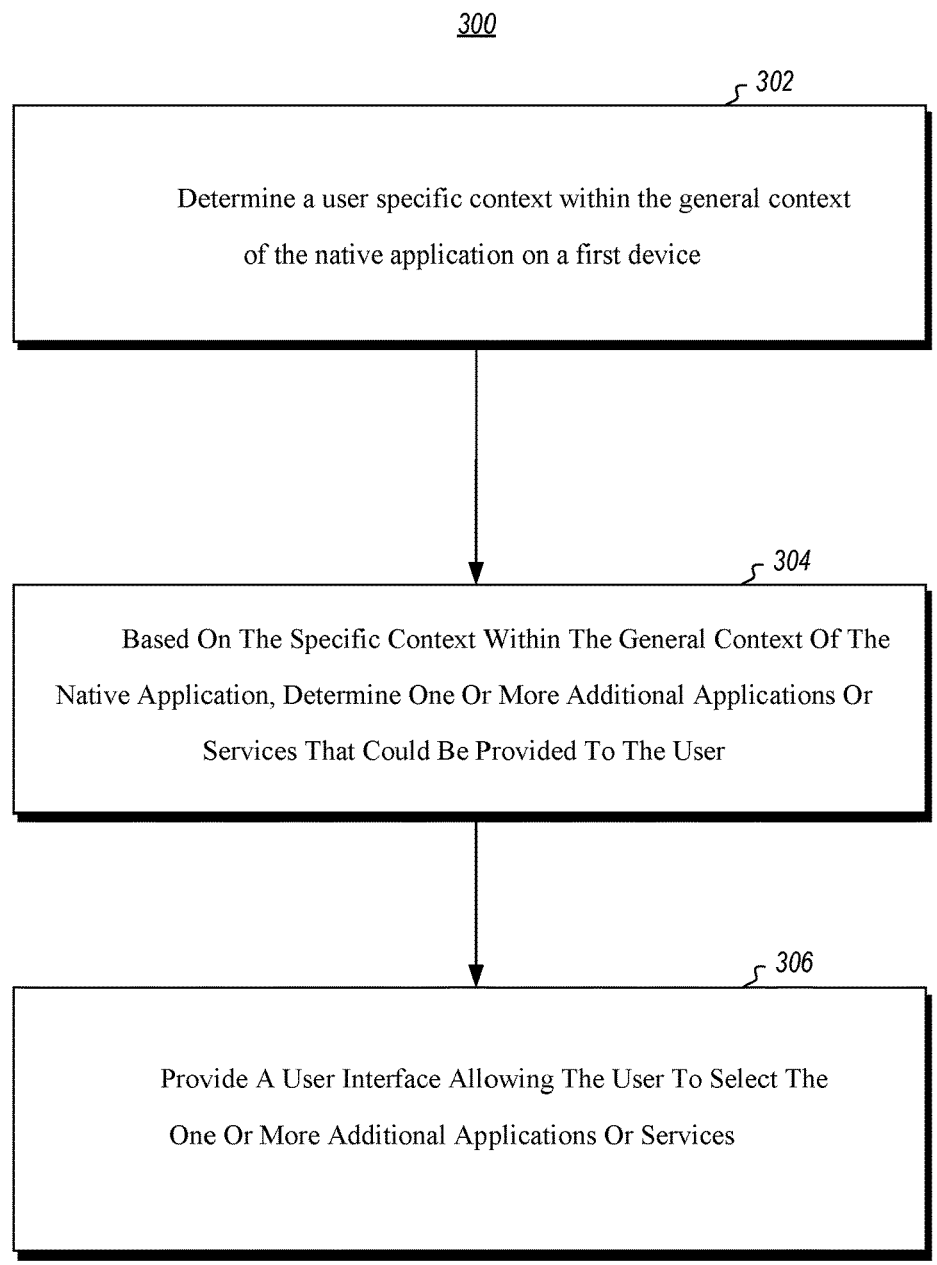
FIG. 3 illustrates a method of providing contextual messages from service to a user in a native application on a system.

Referring now to FIG. 3, a method 300 is illustrated. The method 300 may be practiced in a computing environment. The method 300 includes acts for providing contextual messages from service to a user in a native application on a system.

The method 300 includes determining a user specific context within the general context of the native application on a first device (act 302). For example, as illustrated above, the operating system 104 may determine the context of a user in an operating system based application 106. For example, in a file manager application, the operating system 104 may determine that the user is at the root file menu, an online service quick access location, or some other relevant position in the operating system based application 106.

Based on the specific context within the general context of the native application, the method 300 further includes determining one or more additional applications or services that could be provided to the user (act 304). For example, embodiments may identify one or more applications that are used to open a certain file type relevant to the context of the operating system based application 106. For example, embodiments may identify that the user is within the context of a folder that includes image files in the operating system based application 106. Embodiments may determine that certain photo editing applications would be of use to the user. Alternatively or additionally, embodiments may identify additional storage, subscription packages, etc. relevant to the particular context of the operating system based application 106. For example, if a user is in the context of a music folder in the operating system based application 106, embodiments may determine that music streaming services would be of interest to the user.

The method 300 further includes providing a user interface allowing the user to select the one or more additional applications or services (act 306). For example, the notification 114 may be surfaced to the user to allow the user to select one or more services or applications, or to navigate to one or more services or applications.

The method 300 may be practiced where the one or more additional applications or services comprise applications that can be used to open particular file types being viewed by a user.

The method 300 may be practiced where the one or more additional applications or services comprises additional applications that can be obtained by the user on a different second device. For example, embodiments may identify to a user that an application could be obtained to open particular files on a mobile device when the notification 114 is being displayed on the user's primary device.

The method 300 may be practiced where the one or more additional applications or services comprises one or more subscription services that can be obtained that correspond to file types that are displayed in the native application.

Figure 4:
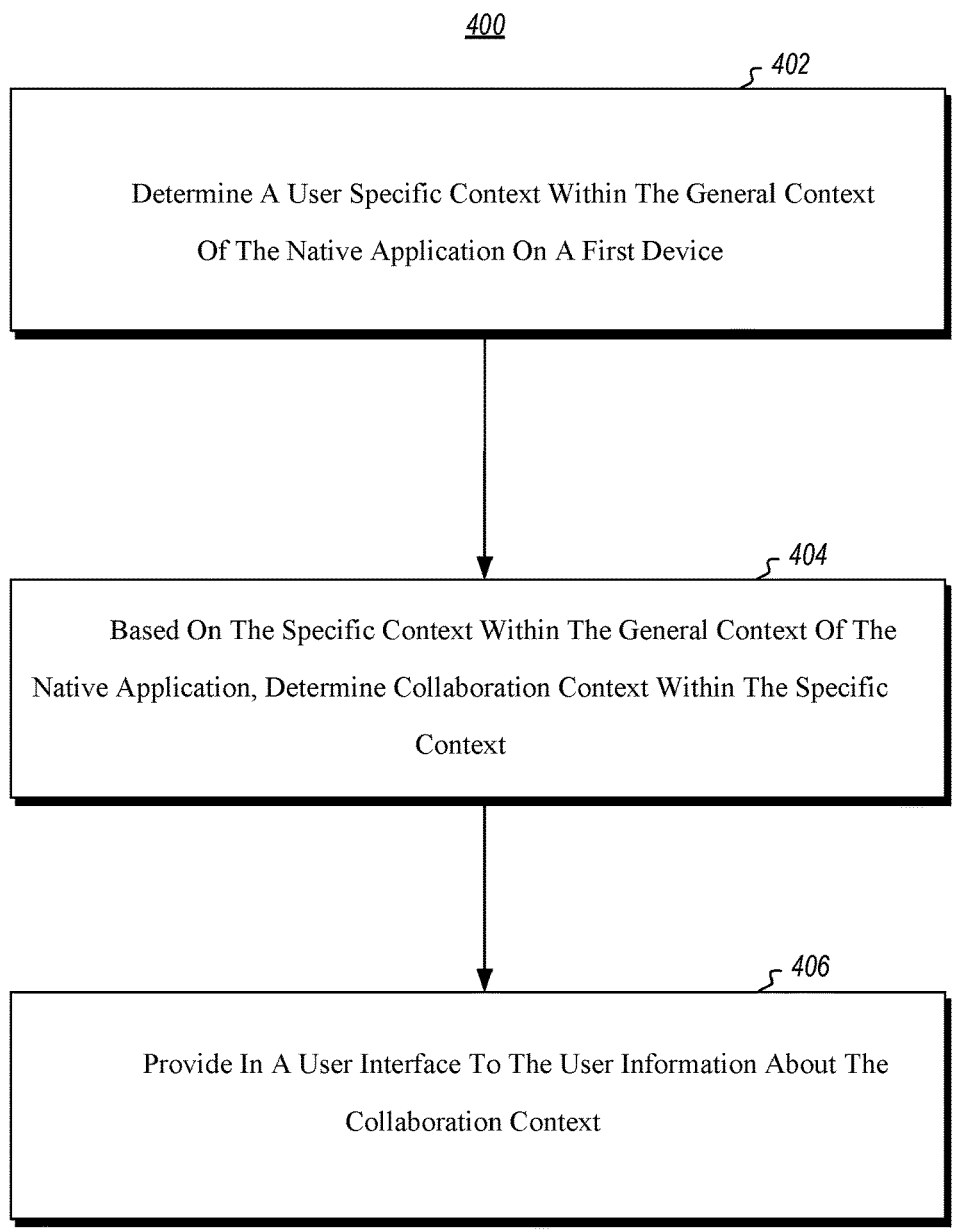
FIG. 4 illustrates a method of providing contextual messages from service to a user in a native application on a system.

Referring now to FIG. 4, a method 400 is illustrated. The method 400 may be practiced in a computing environment. The method 400 includes acts for providing contextual messages from service to a user in a native application on a system.

The method 400 includes determining a user specific context within the general context of the native application on a first device (act 402). For example, the operating system 104 may determine the user's context within the operating system based application 106.

Based on the specific context within the general context of the native application, the method 400 further includes determining collaboration context within the specific context (act 404).

The method 400 further includes providing in a user interface to the user information about the collaboration context (act 406). For example, as illustrated in FIG. 1, a notification 114 may be surfaced to a user.

The method 400 may be practiced where the collaboration context comprises workflow context. For example, the notification 114 may identify what other users are working on various pieces of content available to the user.

The method 400 may be practiced where the collaboration context comprises information identifying one or more other users working on or having the ability to work on one or more files or data within the specific context. For example, the notification 114 may identify other users that have access to certain content such as files, databases, etc.

The method 400 may be practiced where in the collaboration context comprises information identifying actions performed by other users on one or more files or data within the specific context and awaiting user interaction for the current user in the specific context. For example, the notification 114 may identify that other users have operated on data or files and that as a result, those other users are waiting on the first user's input into the data or files.

Figure 5:
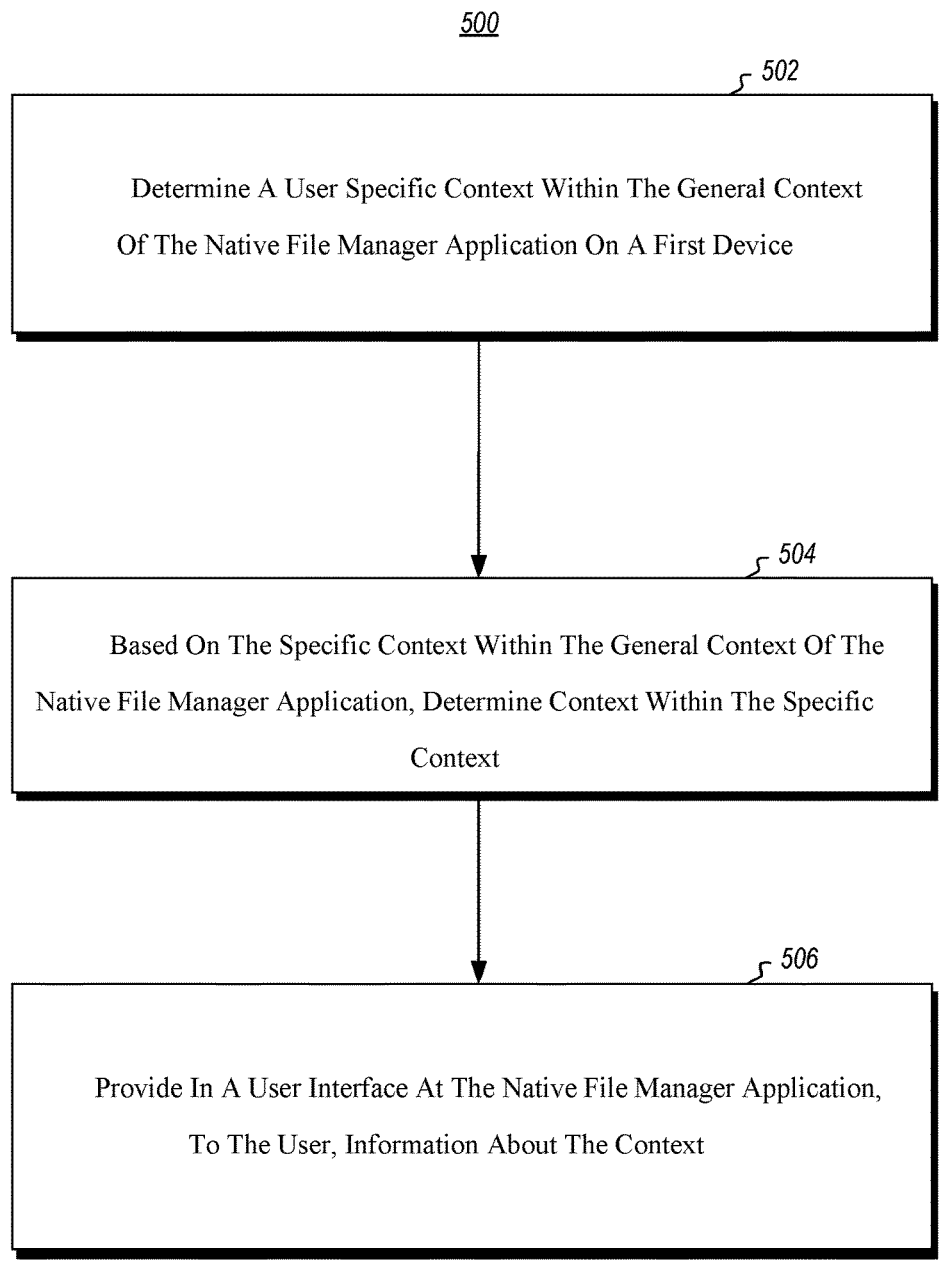
FIG. 5 illustrates a method of providing contextual messages from service to a user in a native application on a system.

Referring now to FIG. 5, the method 500 is illustrated. The method 500 may be practiced in a computing environment includes acts of providing contextual messages from a service to a user in a native file manager application on a system. Thus, this particular example is directed to embodiments where the operating system based application 106 is a file manager.

The method 500 includes determining a user specific context within the general context of the native file manager application on a first device (act 502).

Based on the specific context within the general context of the native file manager application, the method 500 further includes determining context within the specific context (act 504).

The method 500 further includes providing in a user interface at the native file manager application, to the user, information about the context (act 506).

The method 500 may be practiced where the information comprises upsell information.

The method 500 may be practiced where the information comprises collaboration information.

The method 500 may be practiced where the information comprises service information.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A computing system comprising:
one or more processors; and
one or more computer-readable media having stored thereon executable instructions which, when executed by the one or more processors, configure the computer system to control interactions between a cloud storage service and a native application that is integral to an operating system of a user device in order to identify on line services of the cloud storage service useful to the user based on the context of the native application detected by the cloud storage service, and wherein the computer system as configured performs at least the following:
at the cloud storage service, detects that the user device has launched the native application that is integral to the operating system, and has accessed the cloud storage system;
at the cloud storage service determines a user specific context within a general context of the native application launched on the user device;
at the cloud storage service, sends a message to the operating system of the user device that the cloud storage service is being accessed by the native application, wherein the message comprises the specific context within the general context of the native application;
at the operating system of the device, in response to receiving the specific context within the general context of the native application, the operating system of the user device determining one or more on line services of the cloud storage service that relate to one or more files being accessed at the cloud storage service; and in response to the on line services of the cloud storage service determined by the operating system of the user device, the native application displaying a user interface allowing the user to select one or more of the determined on-line services of the cloud storage service.

2. The computing system of claim 1, wherein in response to the specific context contained in the message received at the operating system of the user device, the operating system of the user device also determining one or more additional applications that can be used to open particular file types being viewed by a user.

3. The computing system of claim 2, wherein the one or more additional applications comprise additional applications that can be obtained by the user on a different user device.

4. The computing system of claim 1, wherein the determined on-line services of the cloud storage service comprise one or more subscription services that can be obtained that correspond to file types that are displayed in the native application.

5. The computing system of claim 1, wherein the one or more computer-readable media have stored thereon instructions that are executable by the one or more processors to configure the computer system to:
based on the specific context within the general context of the native application, determine collaboration context within the specific context; and
display in the user interface information about the collaboration context.

6. The computing system of claim 5, wherein the collaboration context comprises workflow context.

7. The computing system of claim 5, wherein the collaboration context comprises information identifying one or more other users working on or having the ability to work on one or more files or data within the specific context.

8. The computing system of claim 5, wherein the collaboration context comprises information identifying actions performed by other users on one or more files or data within the specific context and awaiting user interaction for the current user in the specific context.

9. The computing system of claim 1, wherein the native application comprises a native file manager.

10. The computing system of claim 1, wherein the determined one or more additional applications or on-line services of the cloud storage service comprise upsell information for the determined additional applications or on-line services.

11. A computer implemented method of controlling interactions between a cloud storage service and a native application that is integral to an operating system of a user device in order to identify on line services of the cloud storage service useful to the user based on the context of the native application detected by the cloud storage service, the method comprising:
at the cloud storage service, detecting that the user device has launched the native application that is integral to the operating system, and has accessed the cloud storage service;
at the cloud storage service determining a user specific context within a general context of the native application launched on the user device;
at the cloud storage service, sending a message to the operating system of the user device that the cloud storage service is being accessed by the native application, wherein the message comprises the specific context within the general context of the native application;
at the operating system of the device, in response to receiving the specific context within the general context of the native application, the operating system of the user device determining one or more on line services of the cloud storage service that relate to one or more files being accessed at the cloud storage service; and
in response to the on line services of the cloud storage service determined by the operating system of the user device, the native application displaying a user interface allowing the user to select one or more of the determined on-line services of the cloud storage service.

12. The method of claim 11, wherein in response to the specific context contained in the message received at the operating system of the user device, the operating system of the user device also determining one or more additional applications that can be used to open particular file types being viewed by a user.

13. The method of claim 12, wherein the one or more additional applications comprise additional applications that can be obtained by the user on a different user device.

14. The method of claim 11, wherein the determined on-line services of the cloud storage service comprise one or more subscription services that can be obtained that correspond to file types that are displayed in the native application.

15. The method of claim 11, further comprising:
based on the specific context within the general context of the native application, determining collaboration context within the specific context; and
displaying in the user interface information about the collaboration context.

16. The method of claim 15, wherein the collaboration context comprises workflow context.

17. The method of claim 15, wherein the collaboration context comprises information identifying one or more other users working on or having the ability to work on one or more files or data within the specific context.

18. The method of claim 15, wherein the collaboration context comprises information identifying actions performed by other users on one or more files or data within the specific context and awaiting user interaction for the current user in the specific context.

19. The method of claim 11, wherein the native application comprises a native file manager.

20. A computing system comprising:
an operating system of a user device;
one or more processors;
one or more computer readable storage media having stored thereon executable instructions which, when executed by the one or more processors, configure the operating system of the user device to identify on line services of the cloud storage service useful to the user based on context of a native application launched at the user device and detected by a cloud storage service, and wherein the operating system of computer system as configured performs at least the following acts:
receives a message from the from the cloud storage service that the native application launched at the user device has accessed the cloud storage service, and wherein the message comprises a user specific context within a general context of the native application as determined at the cloud storage service;

in response to receiving the specific context within the general context of the native application, determines one or more additional on line services of the cloud storage service that relate to one or more files being accessed at the cloud storage service; and in response to the determined one or more additional on line services of the cloud storage service, the native application displays a user interface allowing the user to select the one or more of the determined additional on line services of the cloud storage service.

* * * * *